Nov. 6, 1962  H. VOETTER ETAL  3,062,517
GAS-LIQUID CONTACTING APPARATUS
Filed Sept. 6, 1957  3 Sheets-Sheet 1

INVENTORS:
HEINZ VOETTER
HENDRIK VERBURG
FREDERIK J. ZUIDERWEG
BY: Oswald H Milmore
THEIR ATTORNEY

INVENTORS:
HEINZ VOETTER
HENDRIK VERBURG
FREDERIK J. ZUIDERWEG

BY: *Oswald H Milmore*
THEIR ATTORNEY

Nov. 6, 1962 H. VOETTER ETAL 3,062,517
GAS-LIQUID CONTACTING APPARATUS
Filed Sept. 6, 1957 3 Sheets-Sheet 3

INVENTORS:
HEINZ VOETTER
HENDRIK VERBURG
FREDERIK J. ZUIDERWEG
BY: *Oswald H. Milmore*
THEIR ATTORNEY United States Patent Office 3,062,517
Patented Nov. 6, 1962

3,062,517
GAS-LIQUID CONTACTING APPARATUS
Heinz Voetter, Hendrik Verburg, and Frederik J. Zuiderweg, Amsterdam, Netherlands, assignors to Shell Oil Company, New York, N.Y., a corporation of Delaware
Filed Sept. 6, 1957, Ser. No. 682,365
Claims priority, application Netherlands Sept. 7, 1956
3 Claims. (Cl. 261—114)

The invention relates to gas-liquid contacting apparatus and is, more particularly, concerned with an improved tray for contacting a gas with liquid collected on said tray ("gas" being used herein to include vapor), and to contacting columns equipped with such trays. The trays according to the invention are of the type which are divided into a plurality of zones, each zone having a large number of gas-passage openings which are arranged obliquely in relation to the surface of the tray to impart a horizontal momentum to liquid thereon. The invention may be applied to a variety of uses, such as distillation, scrubbing or washing of gases, or treating liquids with gases.

It is known to provide contacting trays with oblique gas-passage openings and to orient the passages with their upper, outlet ends of all passages of the same zone in a common direction, whereby the gas issuing from the openings during normal operation will impart a predominantly horizontal movement to the liquid which is collected on the tray to sweep said liquid across the respective tray zone. (See U.S. patent to Kittel, No. 2,568,749 and German patent to Spiler, No. 506,545.) Such liquid is supplied to the tray from a spray or other inlet, or from the liquid-discharge opening or downcomer of the higher tray.

With the known trays of the above-described type it is difficult to obtain an effectively uniform distribution of the liquid over the surface of the tray, with the result that the layer of liquid on the tray is thicker at some places than at others. The drawback of this non-uniformity in thickness is that the gas flowing upward through the gas-passage openings will mainly flow through those openings above which the liquid layer is relatively thinner. This is unfavorable to an intensive contact between the gas and liquid and significantly reduces the tray contacting efficiency.

The main object of the invention is to provide a tray of the said type which is so constructed that a very uniform distribution of the liquid over the tray area and, consequently, a very intensive and effective contact between the gas and liquid can be obtained.

A further object of the invention is to improve trays of the said type in such a way that the entire tray surface area is utilized effectively even in trays of larger diameters, and that improved capacity for handling gas and liquid is attained, permitting high tray loadings.

In summary, according to the invention the gas-passage openings, which are oblique to the surface of the tray, are arranged with different outlet directions in different longitudinal zones which are arranged as follows: a first zone of the tray is situated entirely on one side of a longitudinal center line or line of symmetry of the tray, a second zone is situated entirely on the other side of the said line, and at least one additional intermediate zone is situated between said first and second zones, the boundary lines between the zones being substantially parallel; liquid-discharge means, such as an ample opening through the tray, are provided and the gas-passage openings in longitudinal adjacent zones are so directed that during normal operation the gas issuing from the gas-passage openings causes the liquid on adjacent zones to flow in opposite directions in the longitudinal directions of the zones.

As a result of this construction, during normal operation two or more elongated liquid-circulation currents and/or zig-zag currents, are formed on the tray, in such a way that, as shown by tests, the thickness of the liquid layer on the tray has a high degree of uniformity.

It should be observed that trays are known in the art in which the liquid flowing over the tray is confined to follow a zig-zag or reversing path by partitions mounted on the tray. These trays are not, however, of the type in which the gas-passage openings are arranged obliquely in relation to the surface of the tray and force the liquid to flow over the tray in a horizontal direction. In the construction according to the invention, moreover, such partitions are omitted.

The flow of liquid from one zone to the adjacent zone for traverse on the latter in the reversed direction is favorably influenced in that, according to the invention, one or more deflectors, such as curved plates extending upwards from the tray surface, are mounted near one or both ends of one or more longitudinal zones, the said deflecting plates being constructed in such a way that they direct the liquid flow to the adjacent zone or zones.

In addition to, or instead of, the said deflectors, the flow from the end of one zone toward an adjacent zone may be promoted according to another feature of the invention by providing additional gas-passage openings which are also oblique in relation to the surface of the tray in one or more end zones which form extensions of and are adjacent the ends of the said longitudinal zones toward which the gas-passage openings thereof are directed, the said additional gas-passage openings being directed transversely to the longitudinal direction and toward the respectively adjacent longitudinal zones.

According to the invention liquid-discharge means are arranged near one or both ends of one or more zones. Liquid from the next higher tray should preferably be supplied to a region near the end of a zone opposite to that toward which the gas-passage openings are directed.

The liquid discharge means may be of the dynamic type, as described in United States patent application Ser. No. 628,296, filed December 14, 1956, or of the static type, as described in French Patent No. 1,122,098. Other discharge means for liquid may also be used. The liquid discharge means is advantageously located to receive liquid from the end of a longitudinal zone toward which the gas-passage openings thereof are directed.

The invention will be further described with reference to the accompanying drawings forming a part of this application and illustrating certain preferred, alternative embodiments. In the drawings, FIGURE 1 is a vertical sectional view of a part of a contacting column equipped with trays as shown in FIGURE 2;

Figure 1:
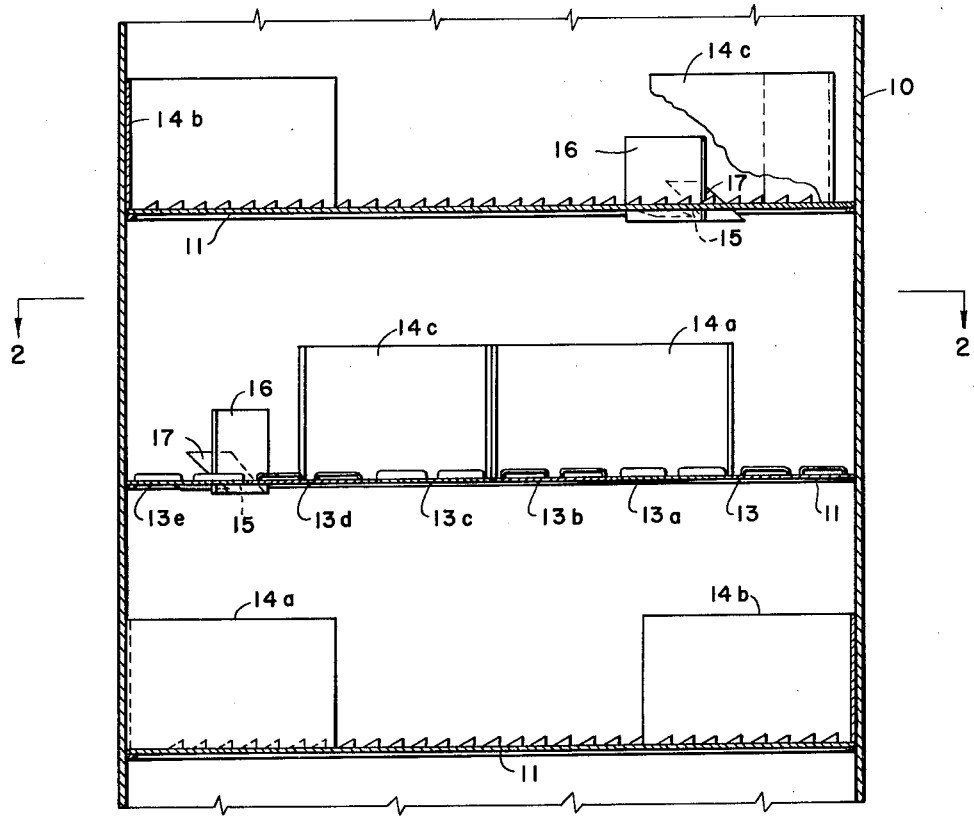
Figure 9:
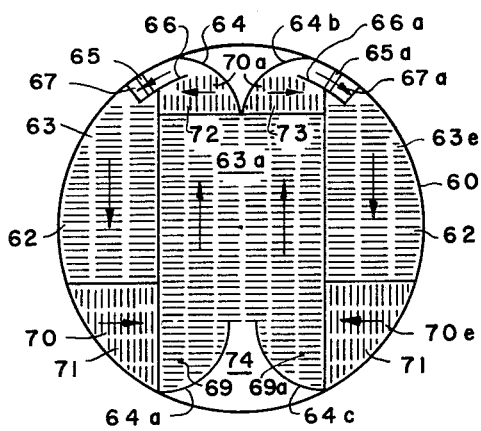
Figure 2:
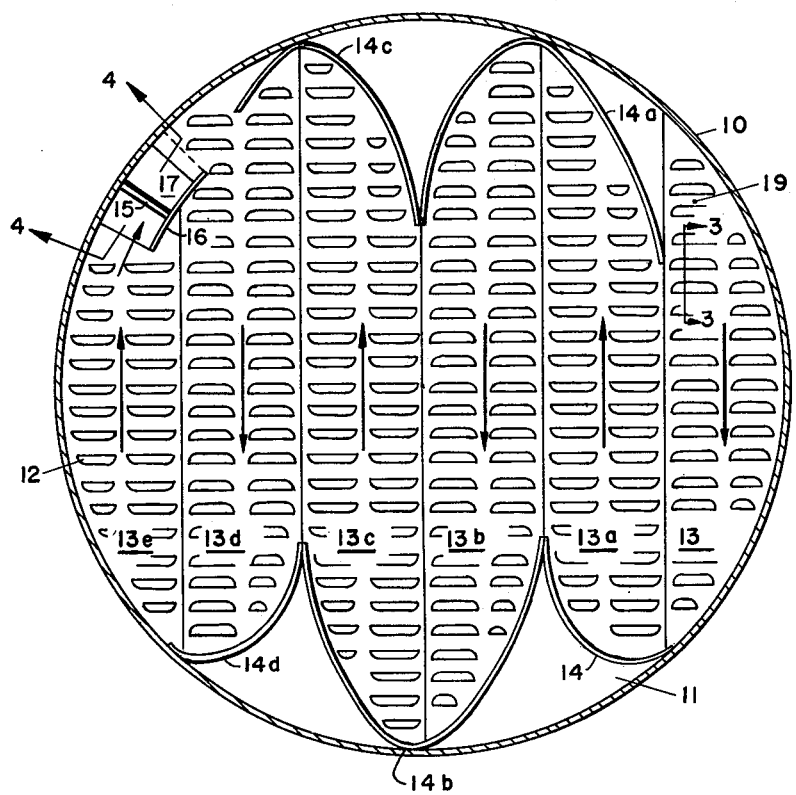
FIGURE 2 is a transverse sectional view, taken on the line 2—2 of FIGURE 1, showing a tray with six longitudinal zones and one liquid-discharge outlet.
Figure 3:
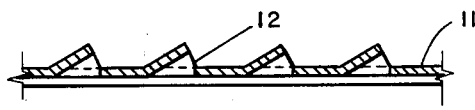
FIGURE 3 is a vertical sectional view taken on the line 3—3 of FIGURE 1, on an enlarged scale, showing the oblique gas-passage openings.
Figure 4:
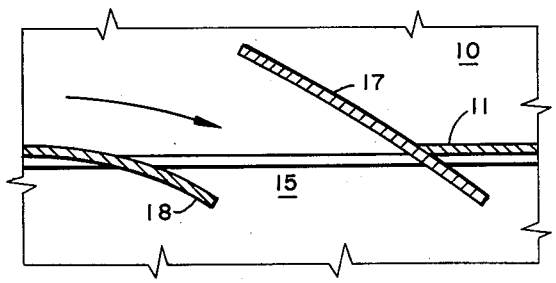
FIGURE 4 is a vertical sectional view taken on the line 4—4 of FIGURE 2, on an enlarged scale, showing the construction of the dynamic downcomer.
Figure 8:
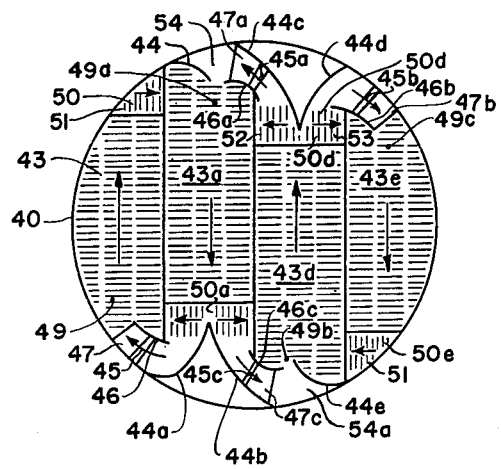
Figure 5:
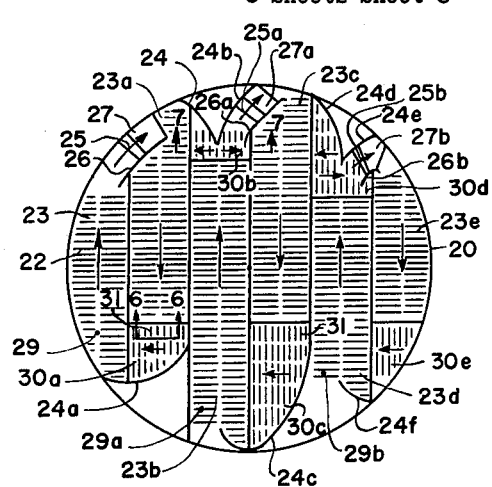
FIGURE 5 is a diagrammatic plan view of a modified tray having six longitudinal zones and three liquid-discharge outlets and, additionally, oblique gas-passage openings in end zones directed laterally toward adjacent zones.
Figure 7:
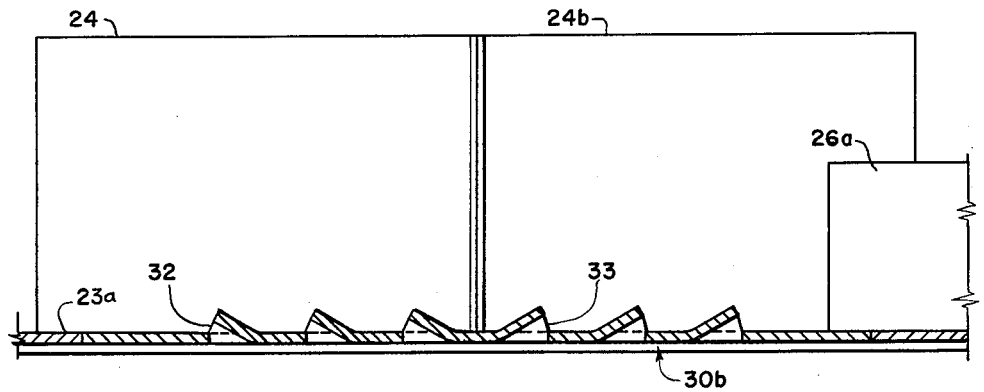
Figure 6:
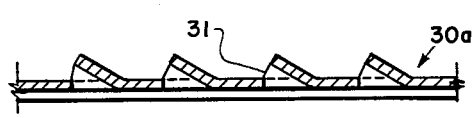

FIGURES 6 and 7 are vertical sectional views taken on the lines 6—6 and 7—7, respectively, of FIGURE 5 on an enlarged scale;

FIGURE 8 is a diagrammatic plan view of a tray according to a second modification, having four longitudinal zones and four liquid-discharge outlets, and additional oblique, laterally directed gas-passage openings in end zones; and FIGURE 9 is a diagrammatic plan view of a tray showing a third modification having only three longitudinal zones and two liquid-discharge outlets, and additional oblique, laterally directed gas-passage openings in end zones.

Referring to FIGURES 1–4, 10 represents the wall of a vertical contacting column through which liquid ascends and gas descends. The column contains a plurality of vertically spaced, transverse, horizontal trays 11. Each tray is made of suitable material, such as louvered sheet metal or of heavier metal plates, providing a plurality of gas-passage openings 12 which are oblique with respect to the surface of the tray. These openings may be elongated slots, as shown, although openings of other shapes, e.g., as shown in the aforesaid U.S. patent to Kittel, may be employed.

Each tray is divided into a plurality, e.g., six longitudinal zones 13, 13a, 13b, 13c, 13d and 13e. Of these the zones 13 and 13e are marginal or side zones and situated in their entireties on opposite sides of a central line of symmetry (dividing the zones 13b and 13c), and the other four are intermediate zones, situated between the marginal zones. The boundaries between these zones are parallel. The tray portions corresponding to these zones may, if desired, be fabricated separately, e.g., from expanded metal, and welded or otherwise fastened together along the boundaries to form a composite tray. There are no partitions between the zones in the embodiment shown and the adjacent zones are in free communication with one another at the tray surface. All gas-passage openings 12 within the same tray are oriented to discharge gas with a horizontal flow component in the same longitudinal direction, as indicated by the arrows in FIGURE 2, it being noted that the arrow directions are opposite in adjacent zones. Near the ends of the intermediate zones are curved deflecting plates 14–14d which extend upwards from the tray surface to a height preferably one-third to two-thirds of the vertical distance between trays which may, for example, be from four to twelve inches. These deflecting plates may, if desired, extend to the full height of the inter-tray space. These deflecting plates serve to direct the liquid which flows longitudinally on the several zones with reversal of flow direction into the adjacent zone. In the case of marginal zones 13 and 13e this function is performed in part by the curved wall 10 of the column.

The tray is provided with a liquid-discharge opening 15, located at the end of the zone 13e toward which the gas-passage openings are directed. This discharge is of the dynamic type, being provided with a curved lateral barrier wall 16 which rises from the surface of the tray to isolate the part of the liquid moving along the zone 13e nearest the column wall 10 from the part flowing farther in from the wall and for deflecting the latter toward the zone 13d. This barrier may extend above the tray to a height somewhat less than that of the deflecting plates 14–14d. The downcomer is further provided with a retaining wall 17 which slopes upwards, preferably along a downwardly convex curve, over the discharge opening from the far edge thereof, in opposition to the direction of liquid flow. The near edge 18 is preferably curved downwards, as shown. The walls 16 and 17 together form a collecting scoop to induce liquid moving along the zone 13e to enter the liquid-discharge opening, while the curved edge 18 aids in effecting a smooth change in the liquid flow direction, thereby insuring a high rate of liquid discharge without the need of providing an excessively large opening and further opposing the upflow of gas through the opening 15 and thereby obviating the need for a hydraulic seal or downcomer pipe which extends down to the next tray. The gas is, therefore, constrained to ascend through the openings 12 even without such a seal or downcomer.

The tray operates as follows: Liquid is supplied continuously to the tray from a higher tray to the region indicated by the reference number 19, which is near the upstream end (opposite to the direction toward which the gas-passage openings 12 are directed) of the zone 13. This placement of liquid can be effected, for example, by orienting each higher tray 90° in the clockwise direction with respect to the adjacent lower tray. Gas flows from the space below the tray through the numerous oblique openings 12 into the space above the tray and, by its dynamic action, prevents the liquid from flowing down through the openings 12. Because of the oblique arrangement of the gas-passage openings 12 and the fact that they are all directed in the same longitudinal direction, the liquid on the zone 13 is forced by the gas to flow along this zone in the longitudinal direction indicated by the arrow.

When the liquid reaches the end of the zone 13 it is led by the curved column wall 10 and the adjoining deflecting plate 14 onto the adjacent zone 13a. As a result of the action of the deflecting plate and the opposed orientation of the gas-passage openings 12 in the zone 13a the liquid changes direction and moves longitudinally through this zone in the opposite direction, as shown by the arrow. This reversal of flow direction is repeated at the far or downstream end of the zone 13a, from which the liquid enters the next zone 13b, guided by the deflecting plate 14a there provided. This procedure is repeated at the end of each successive zone until the liquid flows along the zone 13e. After traversing this zone a portion of the liquid, moving next to the wall of the column 10 (usually the major portion), enters the space between the wall 16 and the column wall and, thence, into the liquid-discharge opening 15, while another portion (usually minor) is deflected by the wall 16 to join the liquid flowing along the zone 13d. The retaining wall 17 deflects the liquid downwards.

During the above flow of the liquid over the tray the gas issues continuously from the several gas-passage openings 12 through the liquid, effecting an intense contact between gas and liquid and disrupting the liquid to throw up a liquid spray, which falls again onto the tray.

In the embodiment of FIGURES 5–7, wherein like parts are denoted by reference numbers corresponding to those used in the first embodiment, increased by ten, the tray 21, mounted transversely within the column 20, has six longitudinal zones 23–23e, provided throughout with gas-passage openings 22 which are oblique with respect to the tray surface, all said openings within the same zone having their outlets directed toward the same end of the respective zone, as shown by the arrows. In this embodiment there are three liquid-discharge devices, each including a liquid-discharge opening 25, 25a or 25b provided with a lateral barrier wall 26, 26a or 26b, and a curved retaining wall 27, 27a or 27b, constructed as previously described. Liquid is delivered to the tray at three points, indicated by the numbers 29, 29a and 29b, e.g., by orienting each tray 180° from the adjacent tray. The tray is also provided with deflecting plates 24–24f, disposed as shown and having the heights previously described.

This tray is, further, provided with end zones 30a–30d, immediately adjoining the ends of the longitudinal zones 23a–23d, respectively, toward which the openings 22 are directed. These end zones contain additional gas-passage openings 31, 32 or 33, e.g., formed as slots, the outlets of which are oblique with respect to the tray surface and are directed toward the adjacent longitudinal zone into which the liquid is to be directed. As is shown in FIGURE 6, the openings 31 of the end zone 30a have their outlets directed laterally toward the longitudinal zone 23, which promotes the crossflow of liquid emerging from the downstream end of the zone 23a in the direction indicated by the arrow in FIGURE 5 onto the zone 23. This assists the action of the deflector 24a. The gas-passage openings in the end zones 30c and 30e are similarly directed, to aid the actions of the deflectors 24c and 24f, respectively. In the case of the end zones 30b and 30d, two sets of oblique gas-passage openings 32 and 33 are provided. As is shown in FIGURE 7, these have their outlets directed in opposite lateral directions to aid the actions of the deflectors, such as the deflectors 24 and 24b in dividing the liquid which flows on the longitudinal zone and directing different portions thereof in divergent directions.

The action of the tray according to FIGURES 5–7 is similar in principle to that previously described; however, the flow pattern of the liquid over the tray is somewhat different owing to the triple supply points and liquid-discharge openings. Thus, liquid supplied to the point 29 flows longitudinally over the zone 23 and is for the most part discharged through the outlet 25 after entering the passage between the column wall and the barrier wall 26; a minor part flows along the outside of the barrier wall 26 onto the zone 23a. Liquid supplied to the point 29a flows longitudinally over the zone 23b onto the end zone 30b, where it is divided into three portions: a large portion, which may be the major part, thereof enters the passage between the deflector 24b and the wall 26a and is discharged through the outlet 25a, aided by the gas issuing from the openings 33; a second portion is deflected by the deflector 24 and the gas issuing from the openings 32, and flows onto the zone 23a. Here it is merged with liquid from the zone 23 and flows longitudinally along the zone 23a onto the end zone 31, where it is deflected onto the zone 23 by the deflector 24a and the gas issuing from the openings 31. Liquid which entered the end zone 30b and was not included in the two portions described above moves along the outside of the wall 26a onto the zone 23c. Similarly, all of the liquid reaching the downstream ends of the zones 23c and 23e is deflected onto the zones 23b and 23d, and the liquid reaching the downstream end of the zone 23d is divided into three portions, which enter the zone 23c, the outlet 25b and the zone 23e repectively.

In the tray according to FIGURE 8 parts corresponding to those of FIGURES 5–7 are denoted by like reference numbers, increased by twenty. The tray differs only in that it contains but four longitudinal zones 43, 43a, 43d and 43e, has four liquid-discharge openings 45, 45a, 45b and 45c, and four liquid supply points 49, 49a, 49b and 49c. Deflection of all liquid occurs in the end zones 50 and 50e and division of liquid into four portions occurs in the end zones 50a and 50d. For example, in the end zone 50d the liquid is first divided into two portions by the deflectors 44c and 44d, aided by the gas issuing from the oblique, cppositely directed gas-passage openings 52 and 53. The major fractions of each of these portions enter the discharge openings 45a and 45b, after flowing between the barrier walls 46a and 46b and the respectively adjacent deflectors. Two minor fractions flow along the outsides of the barrier walls 46a and 46b onto the adjacent longitudinal zones 43a and 43e, respectively. These trays may be mounted with adjacent trays in identical orientation.

In this embodiment the downstream ends of the barrier walls 46a and 46c are spaced from the deflectors 44 and 44e, respectively, to afford an escape passage for liquid which collects in the imperforated tray regions 54 and 54a behind these deflectors and walls.

In the embodiment according to FIGURE 9 parts corresponding to those of FIGURE 8 are denoted by like numbers, increased by twenty. In this case there are only three longitudinal zones 63, 63a and 63e, two liquid-discharge openings 65 and 65a, and two liquid-supply points 69 and 69a. Successive trays are in this case mounted in the column 180° out of orientation. The deflectors 64a and 64c are separated to afford a passage for the escape of liquid onto the active part of the tray from the imperforate, dead region 74 behind these deflectors. The action is similar to that previously described: deflection of total liquid onto the central zone 63a occurs in the end zones 70 and 70e, due to the combined actions of the curved column wall 60, the deflectors 64a and 64c and the gas issuing from the oblique gas-passage openings 71 and division occurs in the end zone 70a. In the latter zone the deflectors 64 and 64b, aided by the gas issuing from the oppositely directed gas-passage openings 72 and 73, divide the liquid into two equal portions, from each of which some liquid enters the discharge openings 65 and 65a and the remainder flows along the outsides of the barrier walls 66 and 66a onto the zones 63 and 63e.

We claim as our invention:

1. A tray adapted to be mounted transversely within an upright contacting column for effecting intimate contact between gas ascending through the column and liquid descending therethrough, said tray being divided into at least three longitudinal zones each of which is provided with a plurality of gas-passage openings for the upward flow of gas to engage liquid collected on the tray, said passages having at least their outlets directed obliquely in relation to the surface of the tray, one of said zones being situated entirely on one side of a center line of the tray, a second zone being situated entirely on the other side of said center line, and at least one additional, intermediate zone being situated between the said first and second zones, the boundary lines between said zones being substantially parallel and said zones being in free communication across said boundaries substantially at the upper tray surface, the outlet directions of the gas-discharge openings throughout at least the major longitudinal extent of each zone being toward the same longitudinal direction and the said longitudinal directions being opposite in adjacent zones whereby, during operation, the gas issuing from the gas-passage openings causes liquid in adjacent zones to flow in opposite longitudinal directions in the respective zones, said tray having means for discharging liquid therefrom, a deflector extending upwards from the surface of said tray and situated at the end of at least one zone toward which said gas-passage openings are directed, said deflector being horizontally concave toward the main part of said zone to deflect liquid flowing longitudinally in said zone into the adjacent zone, said liquid-discharge means including a liquid-discharge opening in said tray situated near the downstream part of the deflector to receive a part of the liquid deflected thereby, and a barrier plate adjoining the said liquid-discharge opening and offset toward said zones from the deflector for isolating said part of the liquid from other liquid deflected by said deflector and further deflecting the said other part of the liquid onto the said adjacent zone.

2. In combination with the tray according to claim 1, a retaining wall sloping upwards over the liquid-discharge opening from the far edge of the opening in relation to the flow direction of said first part of the deflected liquid.

3. A tray adapted to be mounted transversely within an upright contacting column for effecting intimate contact between gas ascending through the column and liquid descending therethrough, said tray being divided into at least three longitudinal zones each of which is provided with a plurality of gas-passage openings for the upward flow of gas to engage liquid collected on the tray, said passages having at least their outlets directed obliquely in relation to the surface of the tray, one of said zones being situated entirely on one side of a center line of the tray, a second zone being situated entirely on the other side of said center line, and at least one additional, intermediate zone being situated between the said first and second zones, the boundary lines between said zones being substantially parallel and said zones being in free communication across said boundaries substantially at the upper tray surface, the outlet directions of the gas-discharge openings throughout at least the major longitudinal extent of each zone being toward the same longitudinal direction and the said longitudinal directions being opposite in adjacent zones whereby, during operation, the gas issuing from the gas-passage openings causes liquid in adjacent zones to flow in opposite longitudinal directions in the respective zones, said tray having liquid-discharge means including a liquid-discharge opening in said tray situated at the end of a longitudinal zone toward which the gas-passage openings are directed, said means being of the dynamic type and including a wall which slopes upwards from the far edge of the opening in relation to the direction of liquid flow and extends over the opening for deflecting liquid downwards into said opening.

References Cited in the file of this patent

UNITED STATES PATENTS

| | | |
|---|---|---|
| 1,032,879 | Carlton et al. | July 16, 1912 |
| 2,568,749 | Kittel | Sept. 25, 1951 |
| 2,737,377 | Huggins et al. | Mar. 6, 1956 |
| 2,853,281 | Hibshman et al. | Sept. 23, 1958 |

FOREIGN PATENTS

| | | |
|---|---|---|
| 518,215 | Belgium | Mar. 31, 1953 |
| 1,075,427 | France | Apr. 14, 1954 |
| 744,906 | Great Britain | Feb. 15, 1956 |